(12) United States Patent
Nishikado et al.

(10) Patent No.: US 6,847,975 B2
(45) Date of Patent: Jan. 25, 2005

(54) PROXY PROCESSING METHOD

(75) Inventors: Takashi Nishikado, Ebina (JP);
Kouzou Hatakeyama, Ayase (JP);
Masahiko Nakahara, Machida (JP);
Yasuhiro Takahashi, Kawasaki (JP);
Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 10/201,960

(22) Filed: Jul. 25, 2002

(65) Prior Publication Data

US 2003/0028515 A1 Feb. 6, 2003

(30) Foreign Application Priority Data

Jul. 30, 2001 (JP) ........................................ 2001-229722

(51) Int. Cl.$^7$ ............................................. G06F 17/30
(52) U.S. Cl. ..................... 707/101; 707/10; 717/109; 710/100
(58) Field of Search ................... 707/101, 10; 710/100; 717/109

(56) References Cited

U.S. PATENT DOCUMENTS 6,665,565 B1 * 12/2003 Stomberg et al. ............. 607/31

* cited by examiner

Primary Examiner—Charles Rones
(74) Attorney, Agent, or Firm—Antonelli, Terry, Stout & Kraus, LLP

(57) ABSTRACT

A proxy processing method to flexibly add/modify customized operations, such as customized user authentication and accounting, is provided. A state transition engine stores state information and moves processing forward by updating states. It has the following characteristics. (1) a state transition table indicating a proxy processing procedure is generated from a state definition file at start-up (i-(i)). (2) A state transition engine implements proxy processing according to the state transition table (1-(2)). (3) A feature is provided to add an extended region for extended features to the session management table. (1(3)). Also, with regard to extended logging: (1) An extended log definition file indicates extended log information to be logged (2-(1)). (2) Extended log information based on the extended log definition is stored in the session management table (2-(2)). (3) Each access log provides two types of separate information, a fixed-length standard log and a variable-length extended log.

20 Claims, 19 Drawing Sheets

FIG.3

Main information in module table entries

| # | Field | Description |
|---|---|---|
| 1 | Module name | Module name |
| 2 | List of state information | List of states provided by the module. The entries in this list are in the same form as the state transition table entries. The state transition table is built by looking up and copying entries with state names indicated in the state definition file. |

FIG. 4

```

# state configuration file

# accept connection
Accept_Clt           # accept client get request header
Get_Rep_Hdr          # get request header
Parse_Req_Hdr        # parse request header
Check_Auth           # check authorization check cache
Check_Cache          # check cache
                     #   if cache hit, goto Get_Cache_Hdr
...
```

State names: Accept_Clt, Get_Rep_Hdr, Parse_Req_Hdr, Check_Auth, Check_Cache characters after '#' in each line are comments Example of state definition file

FIG.5

Main information stored in each session structure (session table entry)

| # | Field | Description |
|---|---|---|
| 1 | Session ID | ID to identify each HTTP session |
| 2 | State information | Information of current processing state. Stored using state ID described later. |
| 4 | Send/receive buffer | Buffer information for sending and receiving requests, replies, etc. |
| 5 | Request information | HTTP request information from Web client to Web server |
| 6 | Reply information | HTTP reply information from Web server to Web client |
| 7 | Processing result information | HTTP processing result, detailed error information, etc. |
| 8 | Module-specific extension information | Module-specific extension information for each module. |

FIG.6

Main information stored in each state transition table entry

| # | Field | Description |
|---|---|---|
| 1 | State ID | State identification ID. Current state information stored in the session table is set using the state ID. When a state is updated to a state other than the default next state (a "goto"-type state transition), the processing function for the state sets the state ID of the target state in the session structure. |
| 2 | State name | Symbolic name of the state. The state ID rather than the state name is used during execution, but the state name is used when the state transition table is built at startup of the proxy device. |
| 3 | State processing function | The processing function for the state. This function performs processing associated with the state. The function's return value indicates the next state to be updated to. For details of the return value, see the description of the state transition engine. |
| 4 | configuration function | Function that is executed just once at startup of the proxy device. The function provides initialization operations to be performed at system startup for the state. For example, the function makes a request to allocate regions in the session structure needed by the state or the modules and converts state names to state IDs for "goto"-type state transitions. |
| 5 | Session initialization function | Function executed when a session structure is created in response to a receipt of a request from a Web client. This function performs tasks such as allocation of necessary resources and initialization of the state/module-specific regions allocated by the configuration function called through #4. |
| 6 | Session termination function | Function executed when deleting a session structure upon completion of processing for a request from a Web client. This function, for example, releases regions dynamically allocated in #3 or #5. |
| 7 | Default next state information | Indicates the next state if the state processing function from #3 returns an "ADV". This information is automatically set up when the state transition table is built at startup. |

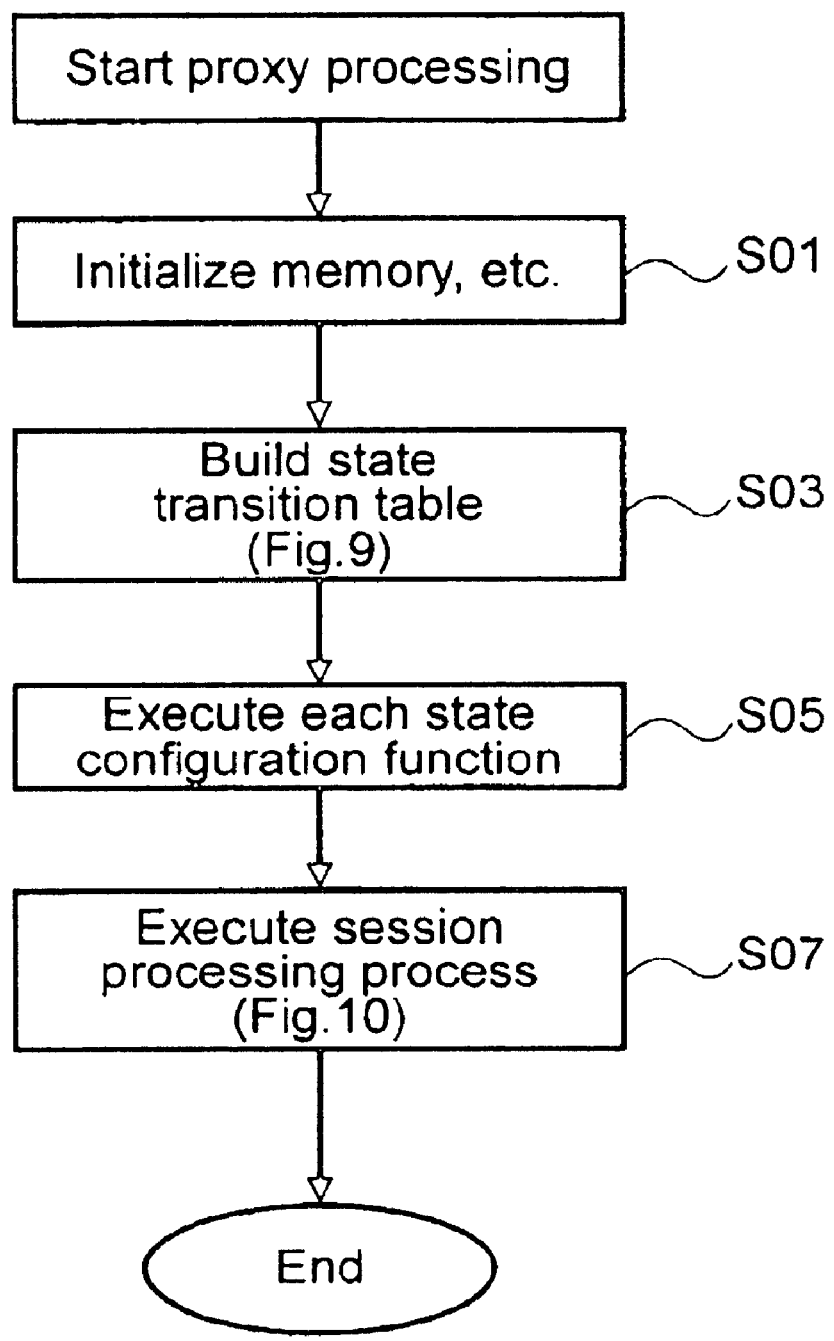

Creation of state transition table at start-up

Flow of operations performed to build state transition table

Flow of state transition engine

FIG. 13

| # | Return value | Action of state transition engine | Purpose and how to use by session processing function for the state |
|---|---|---|---|
| 1 | ADV | * Transition to a default next state. | *Used when moving to a default next state. |
| 2 | GOTO | * Transition to a state indicated in a state ID field in the session structure. | * Used for transition to a particular state.<br>* The target state ID should be set up in the state ID field of the session structure before returning this volume. |
| 3 | SCHED | * Return control to the scheduler and resume from the current state when the session is ready. | * Used when waiting for ready of network I/O with the Web client and server. |
| 4 | ERROR | * Transition to an error information reply state, which allows an error indicated in the results information in the session structure to be sent back to the Web client. | * Used to return an error message to the Web client.<br>* Error information should be set up in the session structure before returning this value. |
| 5 | END | * Generate access log.<br>* Referring to a session termination processing function list created when the state transition table was generated, execute session termination function for each state. Session termination functions free dynamically allocated regions and the like.<br>* Close connections, free the session structure, and terminate HTTP session processing.<br>* Return control to the scheduler and pass control to a ready HTTP session. | * Used when a processing for the session is to be terminated. |

FIG. 15

Extended logging definition

| # | Log type | Header field | Log size | Type # | Display name |
|---|---|---|---|---|---|
| 1 | SPECIAL | — | 8 | 8001 | Specific info |
| 2 | CLT_REQ | — | — | — | Request URL |
| 3 | REQ_FLD | User-Agent | — | — | Browser |
| 4 | REQ_FLD | XXX-Req-Fld | — | 8002 | Specific field 1 |
| 5 | REP_FLD | Server | — | — | Server |
| 6 | REQ_FLD_USR | XXX-Uid | — | — | User |

Description of logging types

SPECIAL: Log special information by extended special operations
CLT_REQ: Log requested URLs
REQ_FLD:Log request header field information
REP_FLD:Log response header field information
REQ_FLD_USR: Set request header field information as user name information in the session management table and log it as standard user information.
REQ_VER: Log request protocol version
REP_VER: Log response protocol version
ZERO_FILL: Fill with 0s according to specified log size

FIG. 18

Execute operations below depending on log type

| | | |
|---|---|---|
| REQ_FLD, REP_FLD | → | Output logging of the extending logging information stored in session management table |
| CLT_REQ, REQ_FLD_USR, REQ_VER, REP_VER | → | Output logging of request URL information, user information, request protocol version and response protocol version stored in session management table respectively |
| SPECIAL | → | If an extended access log hook function is set up, call the function with the session information, log offset information, and log type number information. Otherwise, fill specified log-sized area with zeros. |

PROXY PROCESSING METHOD

BACKGROUND OF THE INVENTION

The present invention relates to a proxy processing method. More specifically, the present invention relates to a proxy processing method that allows flexible feature expansion and logging. The proxy processing referred to here relates to various processing operations, such as the relaying of requests, e.g., A Web access request, from a client terminal to a server, as well as operations for authentication, access logging, caching, accounting, and value-added services.

An overview of conventional proxy processing will be described.

FIG. 19 is a diagram which illustrates conventional proxy processing. In such processing, a proxy device 20 receives requests from a client terminal 10. The request contains a request header and content data. The request header can contain, for example, a URL, browser information, specific user information, and the like. The content data can contain, for example, Web POST data, e.g., a user name and address. The proxy device 20 sends the received request to a Web server 40. The Web server 40 responds to the request by sending a reply. The reply typically contains a reply header and content data. The reply header contains termination information (abnormal, normal), server information, context type, context length, specific reply information, and the like. The proxy device 20 keeps performed fixed accounting operations and keeps an access log of fixed information.

With the conventional technology, however, only fixed proxy operations can be performed, making it difficult to provide extended features. Also, the access log information in the conventional technology is fixed (with a fixed header field), making it impossible to select specific extended information and header fields for logging.

SUMMARY OF THE INVENTION

The present invention overcomes the problems described above by providing a proxy processing method that allows flexible adding and modification of specific extended operations. The present invention also provides flexible logging by allowing selection of specific extended information, header fields, and the like.

According to one aspect of the present invention, the proxy processing method calls for reading a state definition file that stores state names in a transition sequence, the states representing processing steps for the request operation; selecting from a standard module and extension modules a state information entry that matches a state name in the state definition file, the standard module storing session processing functions associated with standard states for standard features, and the extension modules storing session processing functions associated with extended states for extended features; generating, at startup, a state transition table based on a selected state information entry, the state transition table storing a session processing function associated with each state and a next transition state of the processing; and executing a session processing function defined for each state according to the generated state transition table.

According to another aspect of the present invention, the proxy processing method calls for sequentially reading state names from a state definition file containing state names in a transition sequence, each state representing a processing step in processing a request from a client terminal; and retrieving from a module table a state information entry having a state name that was read, the module table containing a list of state information, and each state information storing a state name and an associated state identifier, a session processing function, a configuration function allocating a work region and the like, a session initialization function called when a session is initiated, and a session termination function called when a session is terminated.

According to another aspect of the present invention, in the proxy processing method using a single processing process to simultaneously process requests from a plurality of clients, operations from the receipt of a request to the termination of the processes of the request are handled as a single session, a processing status is stored for each session in a session management table, and a session scheduler is used to schedule client sessions that have become ready to process.

The session scheduler calls for checking for events indicating a ready status for receiving a request and response data and the like; selecting one session management table entry out of entries for ready sessions, if a ready status event is generated or is received; and executing a state transition engine using as parameters the selected session management table entry and event information. The state transition engine calls for looking up a state transition table indicating a transition sequence of states, wherein each state represents a processing step for processing a request from a client terminal, and sequentially executing processing functions in the state transition table entry associated with current state information stored in the session management table.

According to another aspect of the present invention, the proxy processing method includes processes of storing state status representing processing steps in processing requests from client terminals, updating states, and using a state transition engine to sequentially execute processing functions associated with a state. The proxy processing method also calls for executing the state transition engine, wherein the state transition engine calls for: looking up, for each session from a client terminal, a session management table storing information including state information, standard information, and extended information specific to extension modules; using state information in the session management table to obtain a state transition table entry storing session processing functions and default next states associated with a processing state; executing a session processing function from the obtained state transition table entry; determining a next transition state using a value returned from the executed session processing function, and setting up the next state information in the session management table entry; and executing processing for the next state if the returned value is that for transition to a next state, and returning to a scheduler and requesting the scheduler to schedule another ready session if the returned value is that for session rescheduling.

According to another aspect of the present invention, in the proxy processing method, access logging for logging processes of a request from a client is performed with logging data formed from a fixed-length standard log region and a variable-length extended log region. The proxy processing method calls for loading definition information at start-up from an extended logging definition file containing log types to be logged; storing extended logging information based on the definition information in a session management table managing a processing status for a request from a client terminal; and executing logging including extended information based on the definition information.

These and other features are described throughout the present specification. A further understanding of the nature

BRIEF DESCRIPTION OF THE DRAWINGS

FIG. 3 is a diagram illustrating the main information stored in a module table.

FIG. 4 is a diagram illustrating sample items defined in a state definition file.

FIG. 5 is a diagram illustrating the main information stored in a session structure (session management table entry).

FIG. 6 is a diagram illustrating the main information stored in each state transition table entry.

FIG. 7 is a flowchart showing the overall flow of operations performed in proxy processing.

FIG. 13 is a diagram illustrating a return value from a session processing function for each state and the operations thereof.

FIG. 15 is a diagram illustrating an extended log definition file.

FIG. 18 is a diagram illustrating operations associated with log types.

DETAILED DESCRIPTION OF THE PREFERRED EMBODIMENTS

1. HTTP Session Operations Performed by the Proxy Device

HTTP session operations (processing of client requests) performed in this embodiment will be described.

Figure 1:
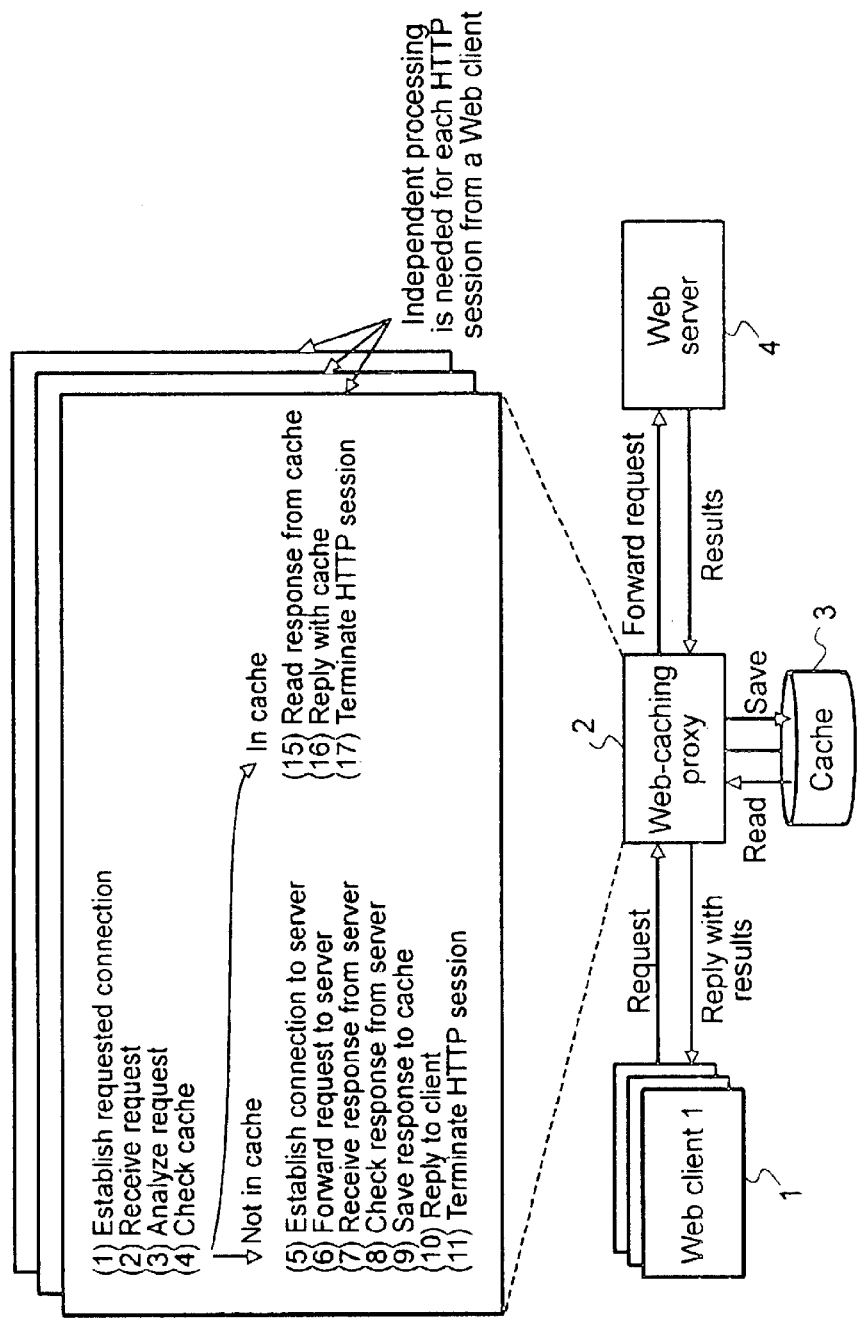
FIG. 1 is a functional block diagram illustrating a flow of operations performed in a standard Web caching proxy process.

FIG. 1 is a diagram illustrating a flow of operations performed in standard Web caching proxy processing. This system includes Web clients 1, a Web caching proxy 2, a cache 3, and a Web server 4. In response to Web access requests from the Web clients, the Web caching proxy will generally perform the following operations. In the figure, the numbers in parentheses correspond to the steps numbred in parentheses below.

(1) When a Web client 1 makes a request, a request connection is set up between the Web client 1 and the Web caching proxy 2 and an HTTP session is initiated with the client terminal.

(2) The web caching proxy 2 receives the request.

(3) The web caching proxy 2 analyzes the request (4) The web caching proxy 2 checks to see if information is available in the cache 3.

a. If information is not available in the cache, the following operations are performed.

(5) A connection from the web caching proxy 2 to the Web server 4 is established.

(6) A request is sent from the web caching proxy 2 to the Web server 4.

(7) A response from the Web server 4 is received by the web caching proxy 2.

(8) The web caching proxy 2 checks the received response from the Web server 4.

(9) The web caching proxy 2 stores content data in the cache 3.

(10) The web caching proxy 2 sends the content data to the Web client 1.

(11) The HTTP session is closed.

b. If information is available in the cache, the following operations are performed.

(15) The web caching proxy 2 reads the content data from the cache 3.

(16) The content data obtained from the cache 3 is sent back to the Web client 1 via the web caching proxy 2.

(17) The HTTP session is dosed.

In this proxy processing method, a process or thread is assigned to each request from a Web client, and procedures corresponding to steps (1)–(17) (the numbers in parentheses 1–17 in the figure) are called sequentially. This method results in a heavy resource load since a process or thread has to be assigned to each request. This leads to a high overhead involving the operating system's process or thread switching, making the method unsuitable for handling large numbers of requests.

In the proxy processing method of this embodiment, a single process handles requests from multiple Web clients. The status for each request (HTTP session) from a Web client, i.e., at which step among steps (1)–(17) the request is processed now, is stored as a state, and requests are processed by updating these states. The proxy processing includes various types of operations, such as customized authentication, relaying of requests, caching, customized access logging, accounting, value-added services, and the like.

2. Module Management

First, tables associated with proxy processing will be described.

2-1. The Module Table

The program executed by the proxy processing device contains a group of modules, which are functional groupings. A module serves as a single unit for the adding and removing of features, and it contains state processing functions, I/O processing functions, module-specific data in shared memory, and the like. The proxy processing device uses a module table to manage the modules. Each module table entry contains a list of state information that the module provides. With this state information, the proxy processing device can build a state transition table at start-up, and features provided by modules can be easily added and removed.

Figure 2:
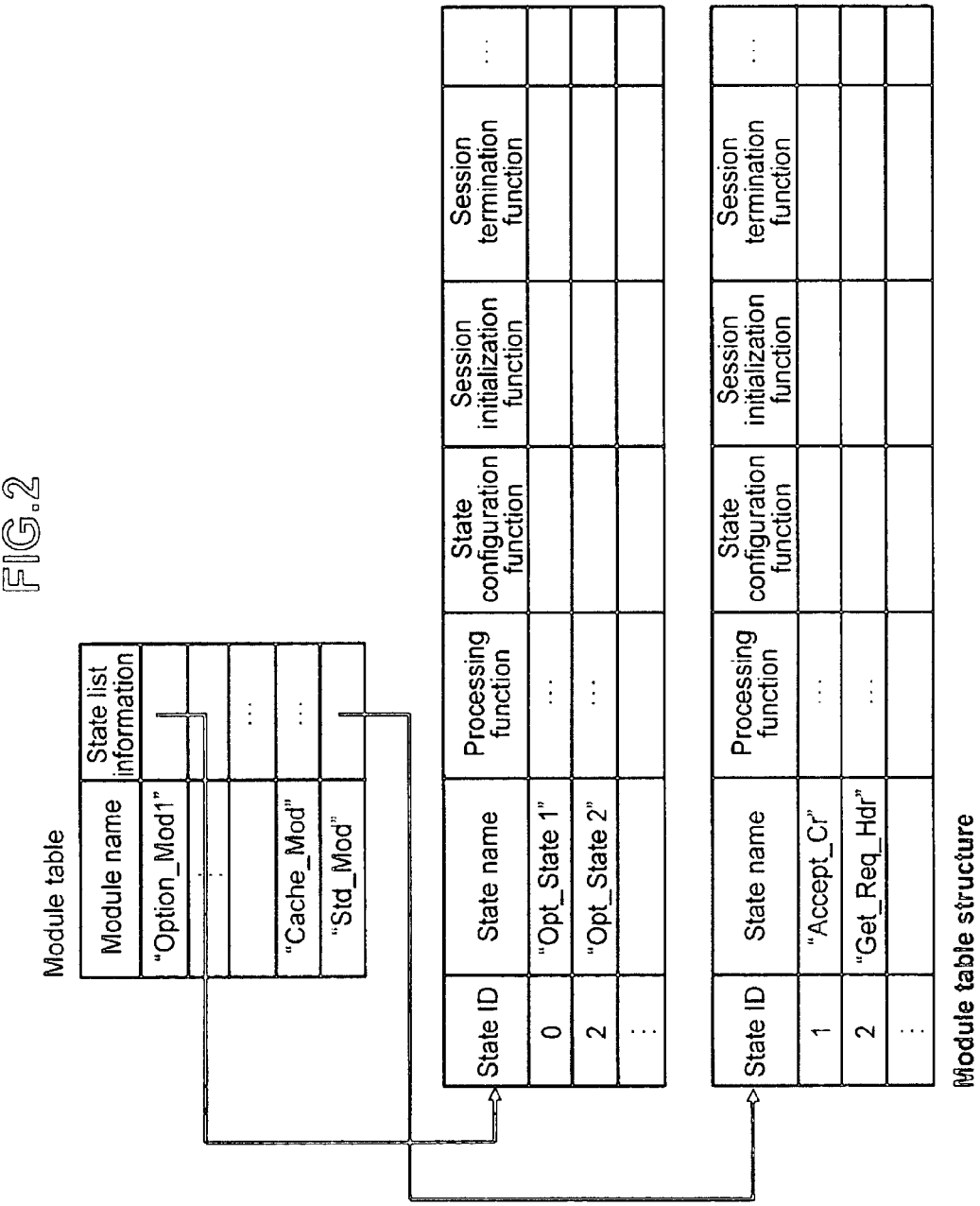
FIG. 2 is a diagram illustrating the structure of a module table.

FIG. 2 is a diagram illustrating the structure of the module table. FIG. 3 is a diagram illustrating the main information stored in the module table.

The module table is a table used to define what kind of modules (features) are grouped together in the program.

Each entry of the module table is associated with a module object, and it contains a name of the module object and a list of state information provided by the module object (see figure for contents of each field). The list of state information is referenced in building the state transition table, and state information selected from the list is used as a base for an entry of the state transition table. Each state information contains a name of the state and a session processing function associated with the state in order to implement the features provided by a module that the state belongs to, such as a standard module and an accounting module. The state transition table is created by selectively combining necessary state information from appropriate modules.

The modules can be static link modules which are registered in advance in the module table, and objects of the modules are statically linked with other objects. Alternatively, dynamic loading of modules can be supported, with modules being registered dynamically in the module table. Even with the static link modules, however, not all features of loaded modules are activated. Only required module features provided by states described in the state transition table are selectively activated by the generation of the state transition table at the start-up time.

In addition to a state name and a session processing function for the state, the state information includes a state identifier (state ID), a state configuration function for allocating regions required by the state or module at start-up, a session initialization function allocating regions needed by the state or module and performing initialization operations and the like when a request is received from a client, a session completion function releasing unneeded regions and performing various termination operations when processes of the request are completed, and the like.

2-2. The State Configuration File

The state configuration file is a file describing state configuration information used to build the state transition table.

FIG. 4 is a diagram illustrating a sample of the state configuration file. The state configuration file contains state names used in the state transition table arranged according to the default state transition sequence. "#" is a special character that indicates that the rest of the line is a comment. Blank lines can also be included. In this example, state names are defined in order: (1) Accept_Clt, (2) Get_Req_Hdr, (3) Parse_Req_Hdr, (4) Check_Auth, and (5) Check_Cache.

2-3. Session Management Table

FIG. 5 is a diagram illustrating the main information stored in a session structure (session management table entry). An overview of the session management table will be presented below.

In the proxy processing method of the present invention, client requests are handled as HTTP sessions, each session starting with the receipt of a request (establishing a communication channel) and ending with the completion of processes of the request. Each entry of the session management table is used to store information associated with an HTTP session, starting with a receipt of a request from a Web client and ending with the completion of processes of the request. The session management table manages the processing status for each request from a client. A session table entry is generated and managed for each HTTP session. In addition to the current (active) state information of an HTTP session, the session table entry stores various standard and extended information needed to process the request from a Web client. The session management table entry associated with an HTTP session will be referred to below as a session structure. In this example, each entry of the session management table includes fields for a session ID, state information, communication route information, a send/receive buffer, request information, reply information, processing results information, module-specific extension information, and the like (see the figure for descriptions of field contents).

Next, region extensions for extension modules will be described. In addition to a region to hold the standard information used by a default HTTP module, this session management table can hold regions specific to extension modules in the session structures. The regions specific to extension modules hold module-specific extension information. If necessary, a module can call a particular function, e.g., via a state configuration function to be described later, to allocate a module-specific region (module-specific extension information) in a session structure.

2-4. The State Transition Table

FIG. 6 illustrates the main information stored in state transition table entries.

Each state transition table entry stores a session processing function for a state corresponding to each processing step (1)–(17) of a proxy operation as described above, and also stores information for a default next state. This state transition table is generated using the state definition file when the proxy operation is started up, as will be described later. In this example, each state transition entry includes: a state ID, a state name, a session processing function for the state, a state configuration function, a session initialization function, a session termination function, and default next state information (see figure for description of fields).

3. Overview of Proxy Processing

FIG. 7 is a flowchart showing the overall flow of operations performed in proxy processing.

When proxy processing is started, the proxy processing device initializes memory, I/O devices, interfaces, and the like (S01). Next, a state transition table is built (S03). For details of this, see primarily FIG. 8 and FIG. 9 and the following descriptions thereof. Next, the proxy processing device executes the state configuration function for each of the states (S05). The execution of the state configuration function for each state is performed only once at start-up. The proxy processing device allocates enough space for the session management table needed for each session. Next, the proxy processing device launches processes for processing HTTP sessions. (S07).

The steps will be described in detail below.

3-1. Building of the State Transition Table at Start-Up

Using the state definition file, the proxy processing device selects session processing features of necessary states from the module table to dynamically build a state transition table when proxy processing is started.

Figure 8:
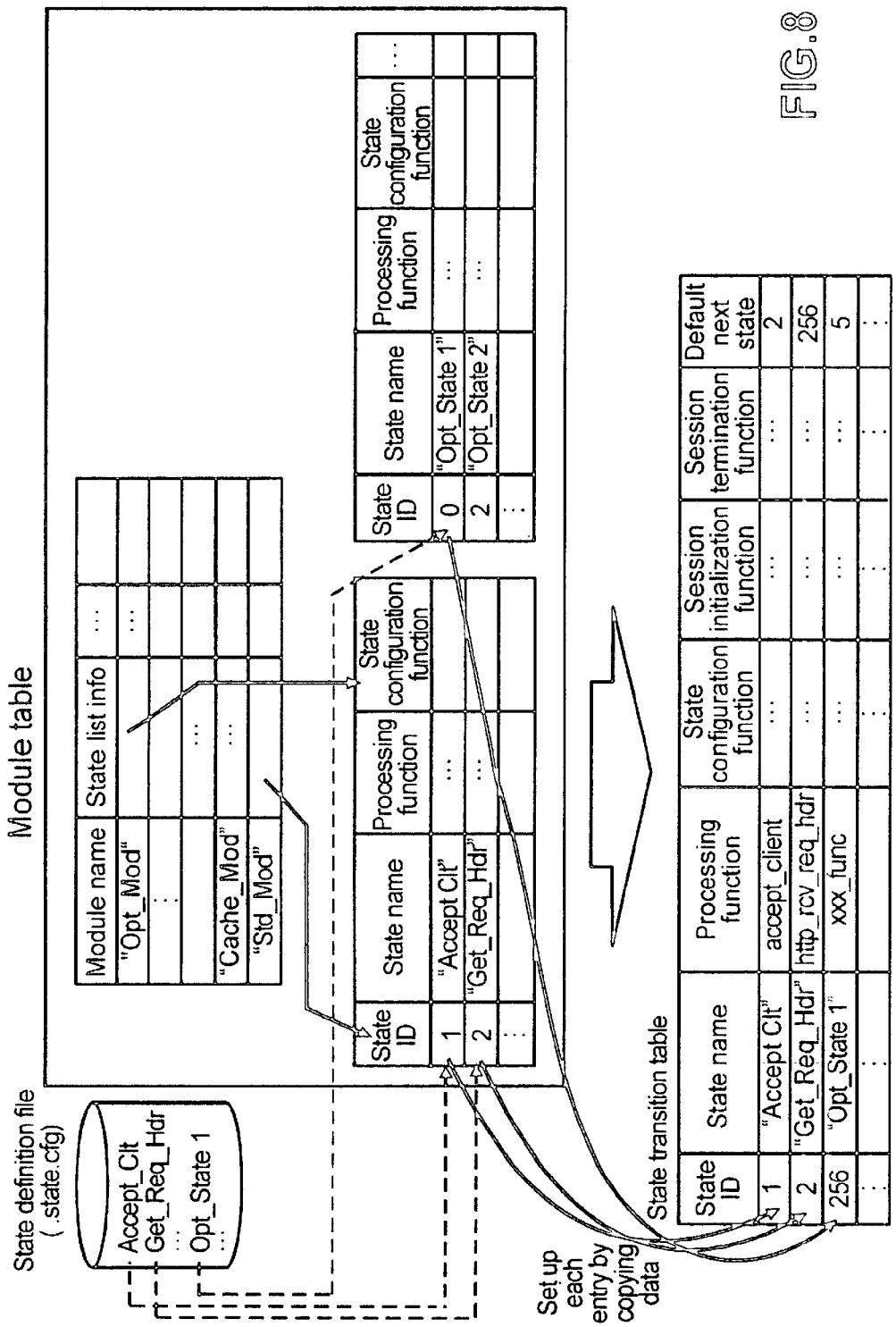
FIG. 8 is a diagram illustrating the building of a state transition table at the time of start-up.

FIG. 8 illustrates how the state transition table is built at start-up. The state transition table is built by sequentially searching the lists of state information in the module table for state transition table entries having state names described in the state definition file, and copying the matching entries.

Figure 9:
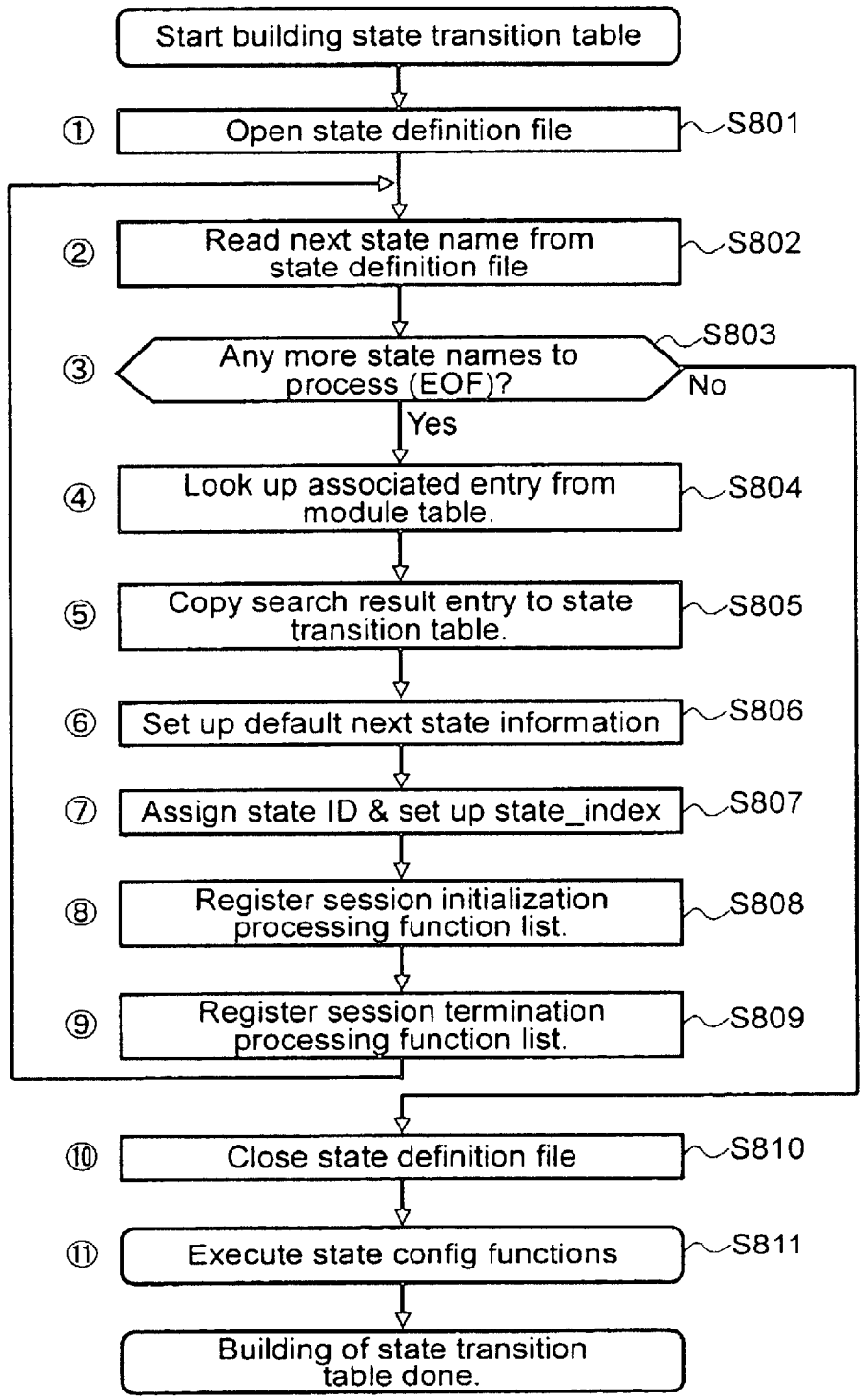
FIG. 9 is a flowchart showing a flow of operations performed in building a state transition table.

FIG. 9 is a flowchart showing a flow of operations used to build the state transition table. The searching of state names is performed according to a predetermined sequence, e.g., starting with a last registered module. Thus, in this case, if multiple modules provide states having the same state name, the entry for the most recently registered module is selected with higher priority. The flow of operations based on the flowchart is as follows.

Step S801 (open state definition file):
 Open the state definition file to read state definition information.

Step S802 (read state names)
  Read state names one at a time in sequence from the state definition file.
Step S803 (check for completion):
  Jump to step S810 if there are no more state names to be processed.
Step S804 (search for entry in module table):
  If there is a state name to be processed, search the lists of state information in the module table for a state transition table entry having the indicated state name.
Step S805 (copy entry to state transition table)
  Copy and register the state information found at step S804 to a new entry of the state transition table.
Step S806 (set up default next-state information):
  Based on the order in the state definition file, set up the default next-state information in the state transition table entry registered at step S805 to point to the state transition table entry to be registered next. If the current entry is the last in the state definition file, set up information (NULL) indicating that the entry is the last.
Step S807 (assign state ID and set up state_index):
  If the state ID is 0, generate a unique state ID and assign the ID. Also, set up a state index (state_index) to allow state transition table entries to be indexed by the state ID. If the state ID is not 0, check to see if the same ID has not already been registered. If so, display an error message.
Step S808 (register session initialization function list):
  If the session initialization function is set up, register the function onto a session initialization function list. This list is used to call initialization functions when a session is initialized.
Step S809 (register session termination function list):
  Similarly, if the termination functions are set up, register the function onto a termination function list
  Return to step S802.
Step S810 (close session definition file)
  Close the session definition file.
Step S811 (execute state configuration functions):
  Execute the state configuration functions for each state transition table entry set up in step S801–step S810. If all state configuration functions are executed successfully, the building of the state transition table is finished.

3-2. Operations of State Configuration Function

The standard information in the session management table is common to all modules and is looked up and updated by each module. The extension information in the session management table is specific to individual extension modules and is looked up and updated by these extension modules. The extension information region is allocated by executing a function to allocate the extended region in the session management table. The configuration function receives offset information indicating the location of the allocated extended region from the extended region allocation function, and this offset information is stored as an offset variable in the extension module. This offset variable is used to reference and update the extended region.

3-3. The Session Processing Process

Figure 10:
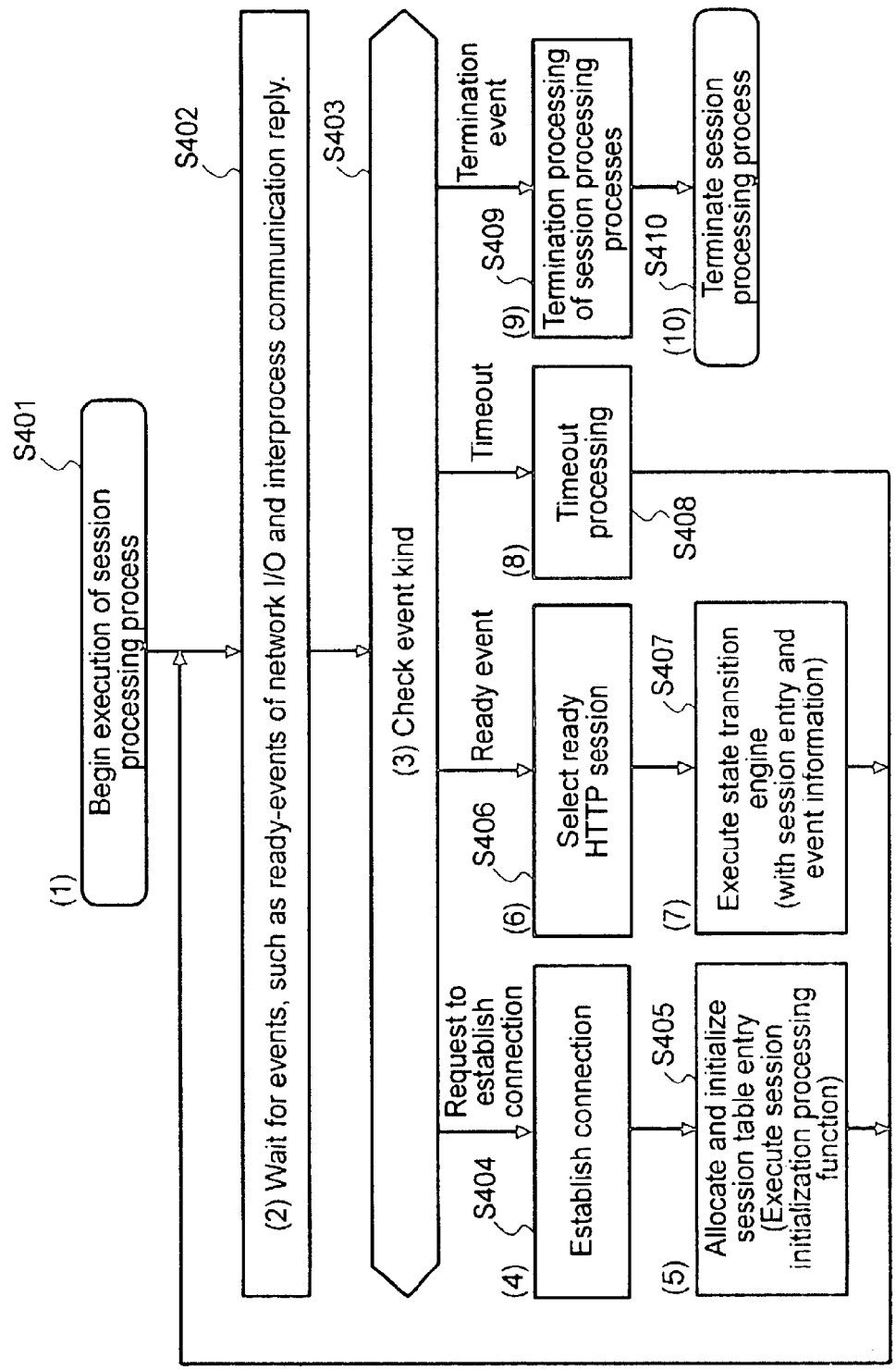
FIG. 10 is a functional block diagram illustrating a flow of operations performed by the session scheduler.

FIG. 10 is illustrates a flow of operations performed by a session scheduler.

The session scheduler performs scheduling of client HTTP sessions that are ready for processing. The operation flow is as follows.

Step S401 (start execution of session processing process): create session processing processes and begin execution of the created processes.
Step S402 (wait for events, such as ready-events of network I/O and interprocess communication reply): The session scheduler checks for events, such as ready-events of network I/Oand interprocess communication reply, and an arrival of a request to establish a connection from a Web client. If no event is detected, the scheduler waits until any of above events is raised or a fixed interval timeout occurs.
Step S403 (check event kind): The kind of the event detected at step S402 is checked, and the processing branches depending on the event kind. The operations that are performed can be, for example, as follows.
(1) If a request to establish a connection from a Web client arrives, jump to step S404.
(2) If a ready-event is raised, jump to step S406.
(3) If a timeout occurs, jump to step S408.
(4) If a termination event in response to an operator instruction arrives, jump to step 409.
Step S404 (establish connection): If a request to establish a connection arrives from a Web client, the session scheduler establishes a connection and control goes to step S405.
Step S405 (create and initialize session table entry) Next, the session scheduler creates a session table entry and initializes the session table entry. The session scheduler looks up the session initialization function list that was generated at step S808 when the state transition table was built. The session initialization functions for the states are called, module extended regions are initialized, and the like. Then, control goes to step S402, and the session scheduler waits for an HTTP request to arrive from the Web client.
Step S406 (select a ready HTTP session): If a readyevent is raised, the session scheduler selects a session table entry for a ready HTTP session to process. Control proceeds to step S407.
Step S407 (execute state transition engine): Next, the state transition engine is called, passing the session table entry and event information as parameters (the operations of the state transition engine will be described in detail later). An example of an event information that has been passed to the state transition engine is information such as "input/output operation is ready on a communication channel associated with the selected session". When control returns from the state transition engine, the session scheduler returns to step S402 and schedules another ready HTTP session.
Step S408 (timeout processing): Even if no event is detected at step S402, the wait at step S402 ends periodically with a timeout and the timeouts for network I/O for each session is checked. If an HTTP session timeout is detected, the corresponding HTTP session is notified of a timeout event and control returns to step S402. As a result, steps S406 and S407 can schedule the HTTP session with a ready-event by the timeout
Step S409 (termination processing of session processing processes): If an operator inputs a termination command, the session scheduler is informed of a termination of proxy processing and performs a processing to terminate the session processing processes. Control then proceeds to step S410.

Step S410 (terminate session processing processes): After the processing at step S409 is completed, the session sch dul r terminates th session processing processes.

3-4. State Transition Engine

Figure 11:
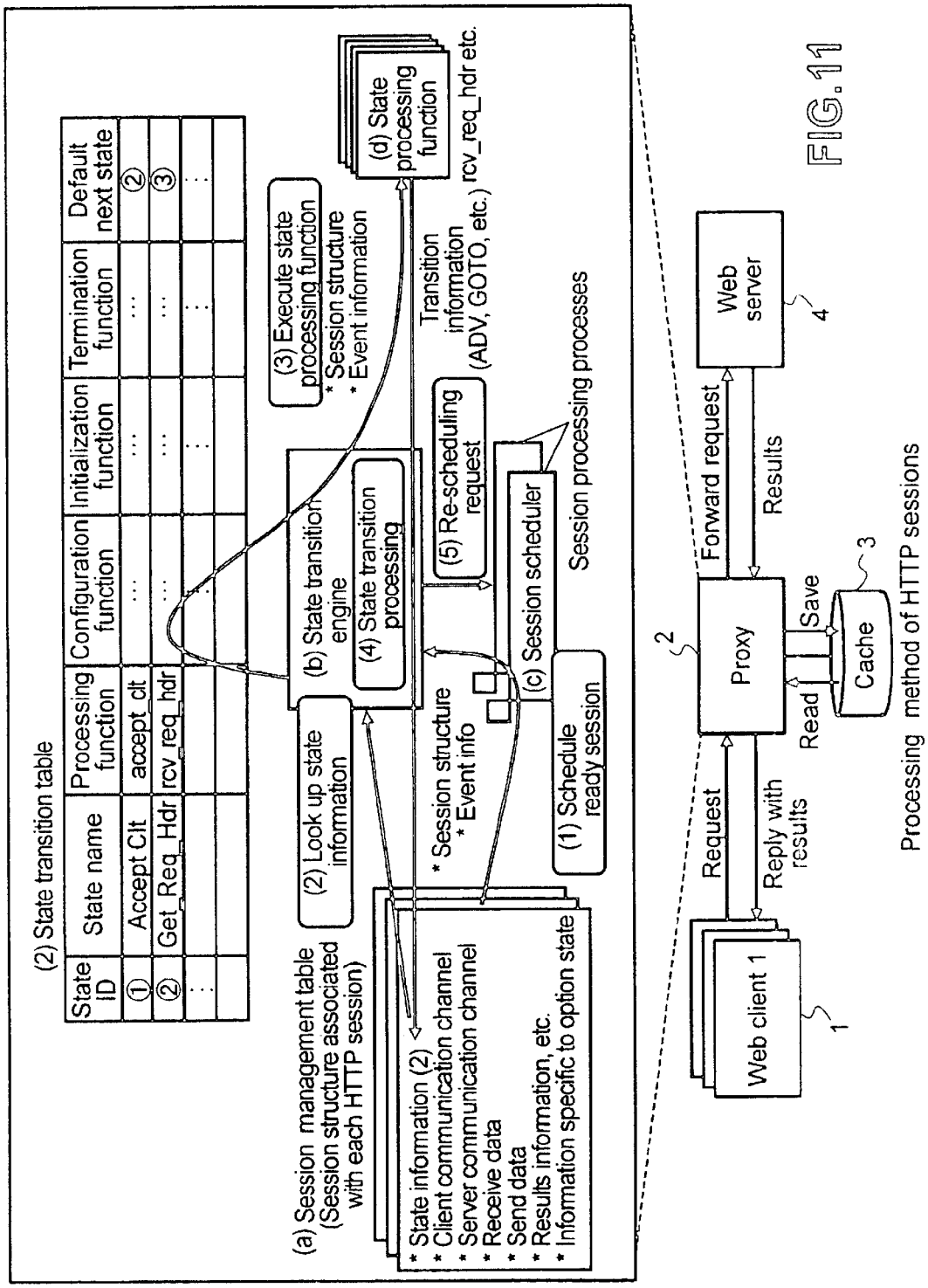
FIG. 11 is a diagram illustrating an example of HTTP session processing by a proxy device.
Figure 12:
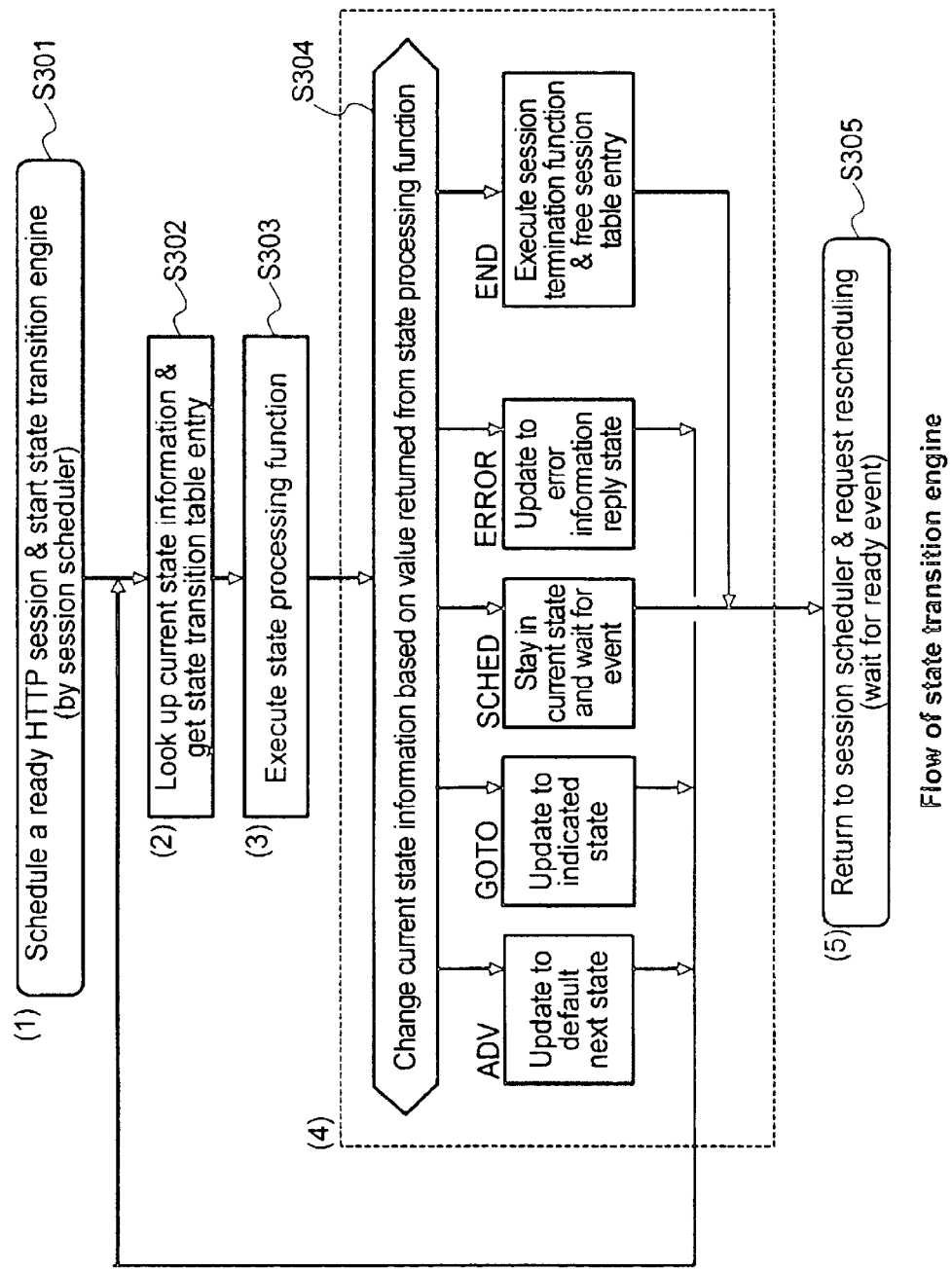
FIG. 12 is a flowchart showing the operations performed by a state transition engine.

FIG. 11 illustrating the HTTP session processing perfomed by the proxy device. FIG. 12 shows a flowchart of the operations performed by the state transition engine. The state transition engine processes each HTTP session by saving current state information of the session processing to the corresponding session table entry and updating the current state information, while sequentially executing session processing functions described in the state transition table entries. The numerals in parentheses below correspond to the numerals in parentheses in FIG. 11.

(1) Step 301: Schedule ready HTTP session and start the state transition engine

First, the session scheduler for the session processing processes detects that an HTTP session has become ready to process via an event such as arrival of data. Then, the session scheduler executes the session transition engine, passing a session structure for the HTTP session and the detailed event information as parameters. For details on the operations performed up to the execution of the state transition engine, see FIG. 10 (the session processing process) and associated descriptions.

(2) Step S302 (look up current state information and obtain state transition table entry): Next, the state transition engine looks up state information (state ID) for the session structure and obtains the associated state transition table entry. In this example, state (2) is looked up.

(3) Step S303 (execute session processing function for the state): Next, the state transition engine executes the session processing function for the state described in the state transition table entry obtained at step S302 (in this example, the session processing function named rcv_req_hdr is executed). When executing the session processing function for the state, the session structure and the event information are passed as parameters (this will be described in detail later).

(4) At step S304 (transition to next state): Next, the state transition engine determines a next transition state from the value returned by the session processing function for the state, and information about the next state is set up in the session structure.

FIG. 13 illustrates the value returned from the state processing function and how it works. The return values can be values such as "ADV", "GOTO", "SCHED", "ERROR", and "END" (see figure for actions of the state transition engine, purpose, and the manner in which the session processing function for the state uses the return values). For example, if the return value is "ADV", a state transition is made to a default next state described in the state transition table entry associated with the current state. If the return value is "GOTO", a state transition is made to a state indicated in a state ID field in the session structure. If the return value is "SCHED", a control is returned to the session scheduler, and an event for the session will be waited for without changing the current state. A processing for the session will be started again with the same state when the session has become ready to process. If the return value is "ERROR", the state will change to a state for error information reply. If the return value is "END", a processing for the HTTP session is terminated. In this case, the session termination functions described in the session termination function list are executed, the associated session table entry is released, and control returns to the session scheduler.

If the return value is not "END" and not "SCHED" (e.g., the return value is "ADV", "GOTO", or "ERROR"), control returns to step S302 and subsequent state processing is performed. If the return value is "END" or "SCHED", control goes to step S305.

(5) Step S305 (return to session scheduler and request for rescheduling):

If a rescheduling is necessary in a case such as waiting for the arrival of data to process from a network, "SCHED" is returned as the return value by the session processing function for the state. If a processing of the HTTP session is to be terminated, "END" is returned by the session processing function. In both cases, "SCHED" and "END", control returns to the session scheduler, and the session scheduler schedules another ready session.

Figure 14:
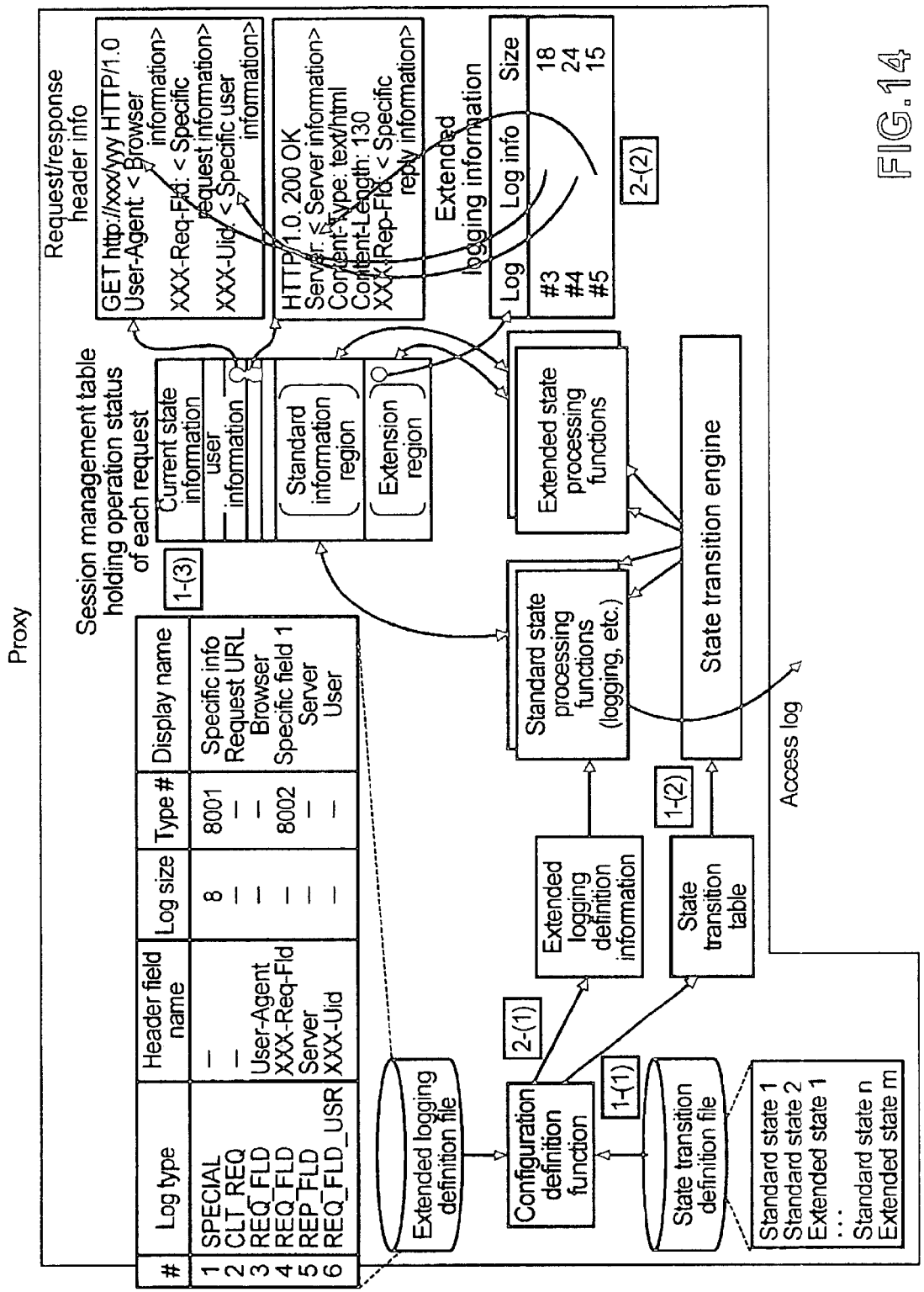
FIG. 14 is a functional block diagram illustrating an example of proxy operations.

FIG. 14 shows a simplified diagram of proxy operations.

As described above, the state transition engine in this embodiment saves current state information and updates it in the session management table entry. Characteristics of the state transition engine will be described.

(1) By a configuration function at startup, the state transition table to indicate a proxy processing procedure is built using a state definition file (see 1(1) in the figure).

In this embodiment, the processing of requests from Web clients are divided into states, and a flexible proxy processing is can be provided by building the state transition table that indicates the processing procedures following the state definition file. With the insertion/addition/replacement of state names in the state definition file, customized processing can be realized for various needs, such as customized accounting and authentication.

(2) The state transition engine is used to implement proxy processing according to the state transition table (see 1-(2) in the figure).

According to this embodiment, functions such as the ones listed below are registered and defined for each state. Proxy processing is implemented by having the state transition engine execute these functions according to the state transition table created at (1). The functions can carry out various customized operations, e.g. (a) a session processing function for the state, (b) a configuration function for various initializations at startup, (c) a session initialization function called when a session is started, and (d) a post-processing function (termination function) for when a session processing for the session is completed. By registering the functions for the extended states, various customized operations can be carried out.

(3) Additional feature to add extended regions used for extended functions in each session management table entry is provided (see 1-(3) in the figure).

This embodiment provides a feature for adding extended regions to the standard information region in each session management table entry that manages the processing state for an individual client request. A configuration function (b) for each state specified in each state transition table entry is executed at startup, and it uses the extended region allocation feature to allocate extended regions if necessary. The allocated extended regions store specific information that is necessary for the processing by the extended states for each session. Each session management table entry can include, for example, current state information, user information, standard information, and extended information. The initialization and termination operations on these regions in each session management table entry can be performed by the session initialization function (c) and the session post-processing function (d).

4. Extended Logging

An embodiment for an extended logging, which is an extension to standard logging, will be described with reference to FIG. 14.

FIG. 15 illustrates an extended logging definition file.

(1) Indicate extended log information to log with an extended logging file (see 2-(1) in FIG. 14).

In this embodiment, an extended logging definition file contains log types, request or response header field names to be logged, log sizes, type numbers, display names, and the like. When the proxy processing device is started up, the definition information is loaded from the file as extended logging definition information. Access logging operations are performed according to this definition, thus providing flexible logging.

The log types are as shown in the FIG. 15. The log size indicates the size of the log if the logging size is fixed. The type number is a unique number to distinguish log contents. In particular, it is used for logging information for special extended operations (SPECIAL). The display name is a name displayed by log analysis/dump tools.

(2) Store extended logging information in the session management table following the extended logging definition (see 2-(2) in FIG. 14).

When parsing request and response headers, and the like, information defined by extended log types (such as $REQ_{13}$ FLD and REP_FLD) are stored as extended log definition information in each session management table entry. Information defined by standard log types (such as CLT_REQ_URL, REQ_FLD_USR, REQ_VER and REP_VER) are stored as standard log definition information in each session management table entry.

(3) Make each access log with two types of separate loggings, a fixed-length standard log and a variable-length extended log.

Figure 16:
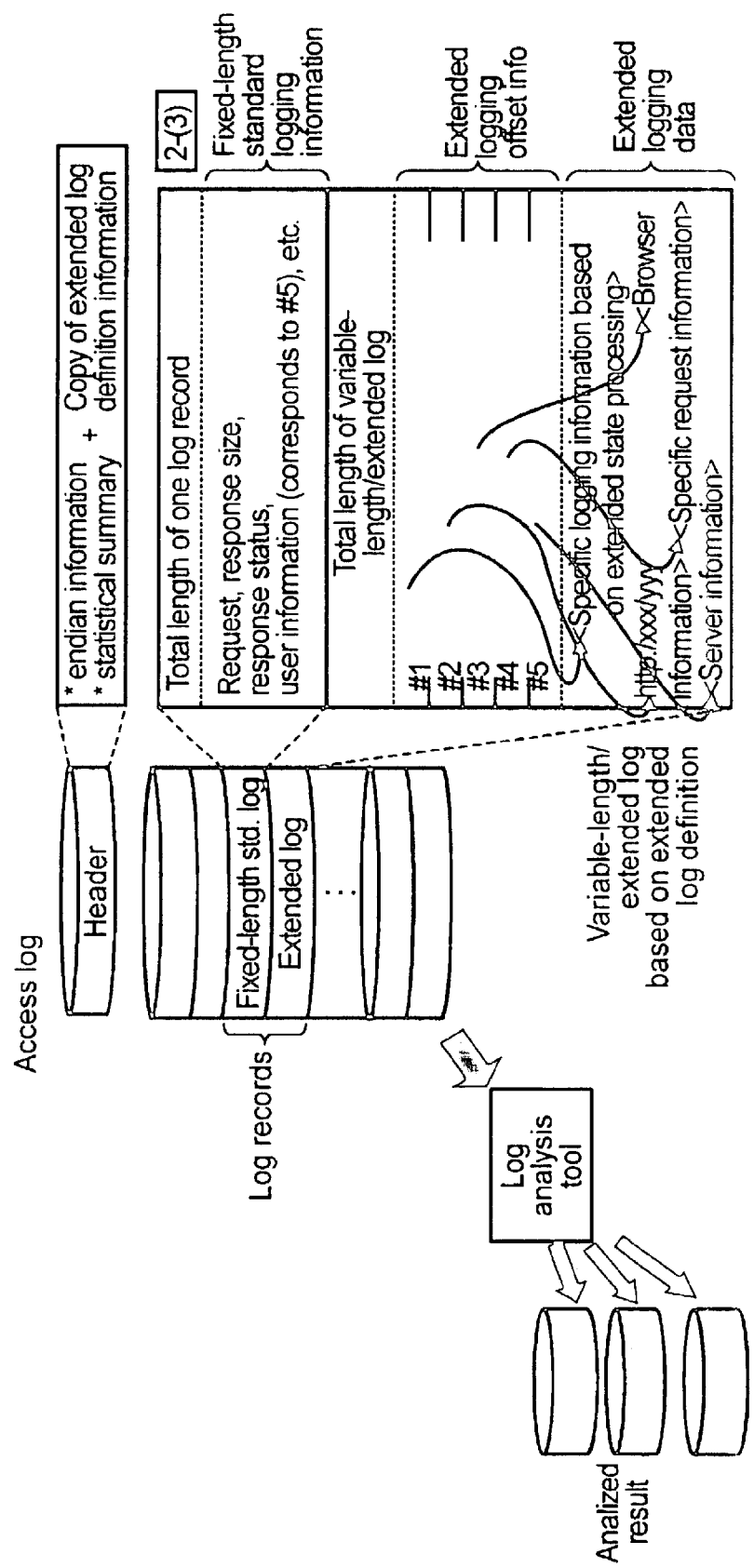
FIG. 16 is a diagram illustrating how access logs are recorded.

FIG. 16 illustrates how access logs are recorded (see 2-(3) in the figure). The processing for making an access log will be described.

Each access log is formed from a fixed-length standard log that logs standard and common log information and a variable-length extended log that logs according to the extended logging definitions described above. The fixed-length standard log is output based on standard information in each session management table entry, while the variable-length/extended log is output using the extended information, as well as the standard information in each session management table entry. This provides extendable access logging.

The length of each access log is a multiple of a fixed block size and is indicated at a start field of the fixed-length standard log. This allows high-speed log processing of the variable-length log. The fixed-length standard log information can include request and response sizes, response status, user information (corresponds to #5), and the like.

In addition to having total length information of the variable-length extended log region, the variable-length extended log region includes offset information (an array of offsets) that indicates where each extended log defined by the extended logging definition is output, and the actual extended logging data (extended log information) for each extended log. By providing the array of offsets, the position of each extended log in the variable-length log can be obtained with a single indirect access operation. Thus, statistical operations can be performed on specific extended log fields in the log, e.g., tabulating fields, at high speeds. The size of each extended log data can be determined from offsets for previous and subsequent extended logs, and string-type data can be processed without knowing size information (excluding issues of maximum buffer size) because the string-type data is always terminated with a NULL byte.

An extended log for a "SPECIAL" type is output by a hook function called from the standard access log processing function. If the "SPECIAL" type extended log is required, the hook function is set up by a state configuration function for an extended state. A hook function variable indicates a hook function to call. If a non-zero call address is set in the hook function variable, the hook function indicated by the hook function variable is called when making each access log, thus providing loggings specific to extended states. This allows extended loggings specific to customized features.

A log header is output at the start of each access logging file. This log header contains endian information, statistical summary information, a copy of the extended logging definition information, and the like. The endian information allows logs to be analyzed even if the machine uses a different byte-endian system. The statistical summary information allows simple summary operations without analysis tabulation of the entire access log stored in the access log file. A copy of the extended log definition information can provide information on what types of logs are stored, how to access the logs, and how to display the logs in the variable-length extended region.

Thus, a log analysis tool can output various types of analysis results based on the gen rated access log.

Figure 17:
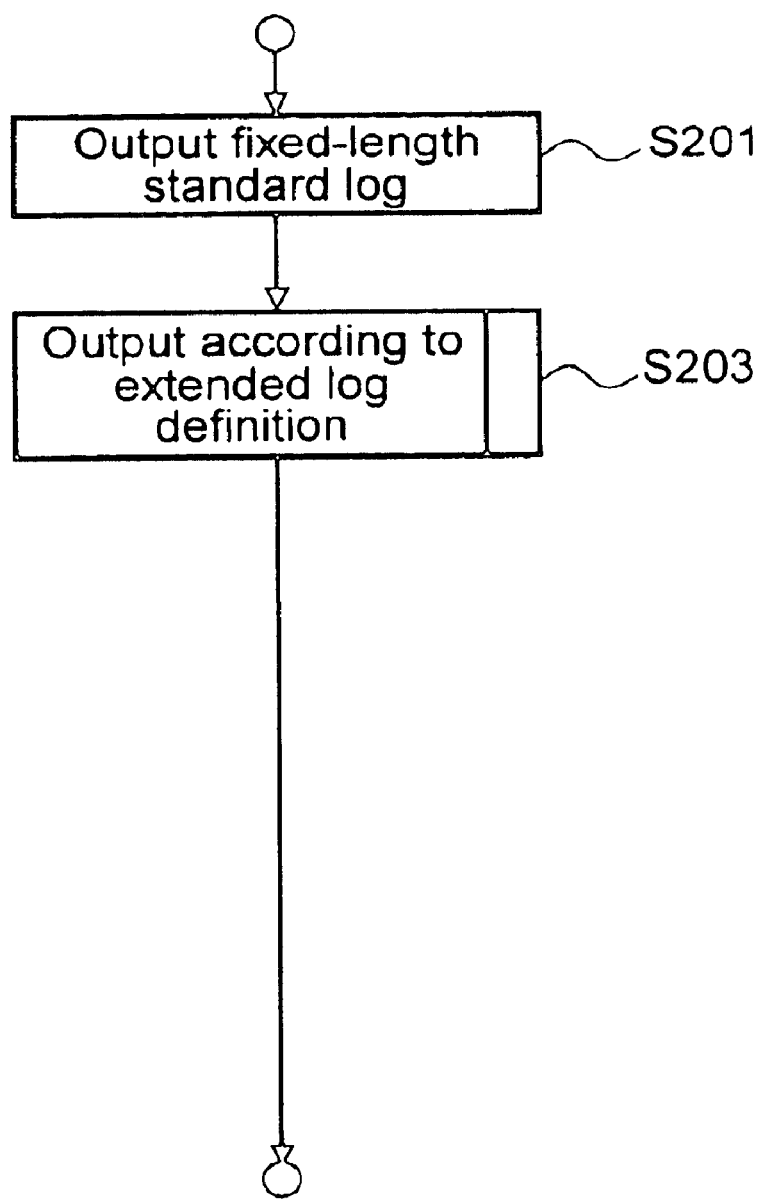
FIG. 17 is a diagram illustrating a flow of operations performed for outputting an access log at the end of each session.
Figure 19:
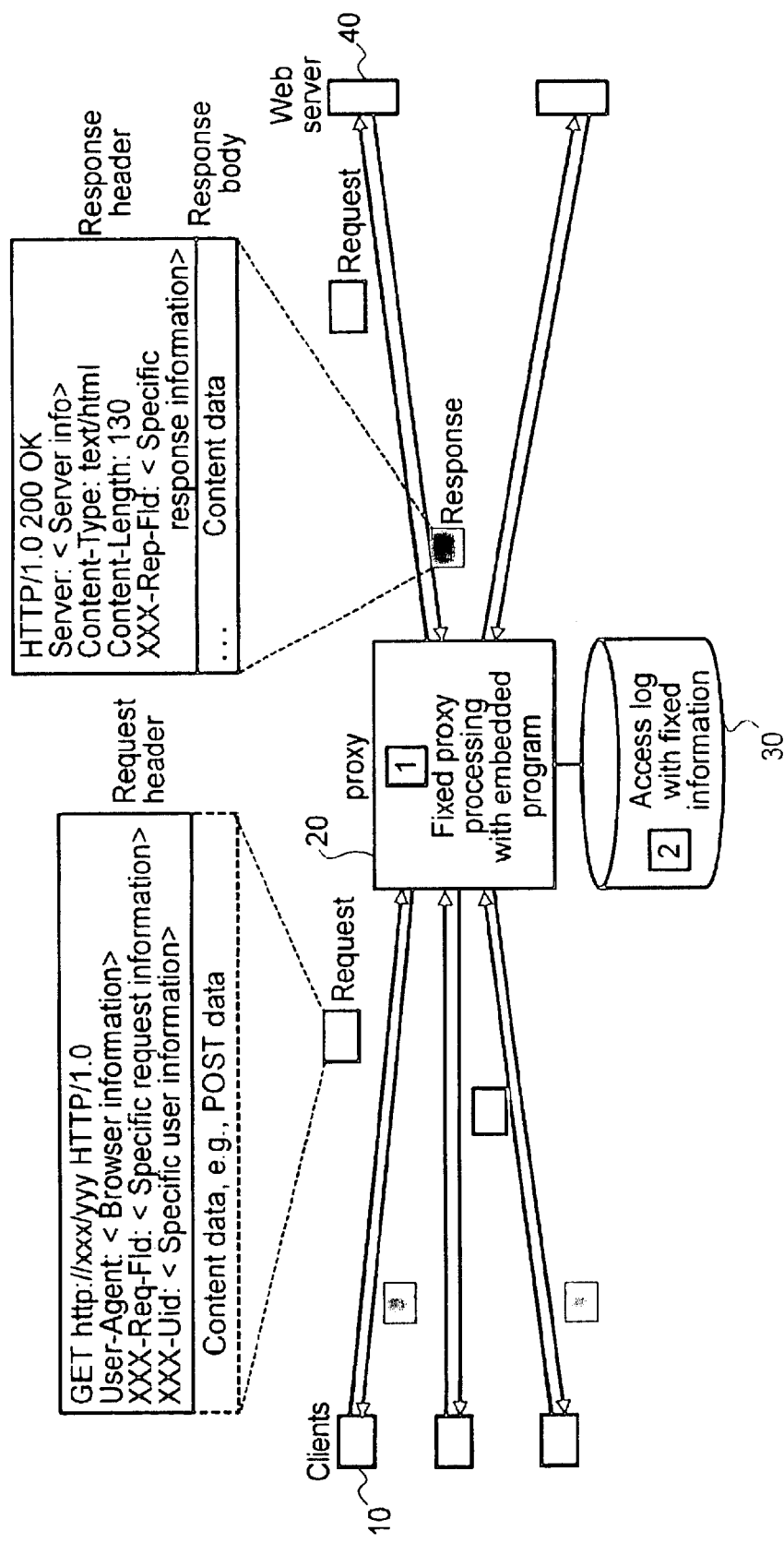
FIG. 19 is a functional block diagram illustrating conventional proxy processing.

FIG. 17 illustrates a flow of operations performed when outputting an access log at the end of each session.

S201: When a session is terminated and an access log output operation is called, the access log output operation looks up the standard information in the session management table entry associated with the session and outputs a pre-determined fixed-length standard log. The fixed-length standard log is log information that is fixed and always output in this proxy.

S203: Following the instructions in the extended log definition file, offset information indicating the output position for each extended log and data of each extended log are output in sequence as the extended log.

FIG. 18 illustrates various operations associated with the log types indicated in the extended log definition file at step S203.

In the description set forth above, the execution of the session initialization functions is performed by the session scheduler, and the session termination functions are executed by the state transition engine called by the session scheduler. The present invention is not restricted to this, however, and it would also be possible to execute session initialization functions by the state transition engine, and/or session termination functions can be executed by the session scheduler.

The proxy processing method and proxy device of the present invention can also be provided via a proxy processing program, a computer-readable storage medium containing a proxy processing program, a program product containing a proxy processing program capable of being loaded into the internal memory of a computer, a computer, such as a server, that contains the program, and the like.

As described above, the present invention provides a proxy processing method that allows customized operations, such as customized user authentication and accounting, to be added and modified in a flexible manner. The present invention also allows a flexible access logging by selecting logging items for information specific to customized features and special header fields to be logged, and it allows high-speed analysis and tabulation operations on the access log.

The specification and drawings are, accordingly, to be regarded in an illustrative rather than a restrictive sense. However, it will be evident that various modifications and changes may be made thereto without departing from the broader spirit and scope of the invention as set forth in the claims.

We claim:

1. A proxy processing method including:
   a step of loading definition information at start-up from an extended logging definition file containing log types to be logged;
   a step of storing extended logging information based on said definition information in a session management table managing a processing status for a request from a client terminal;
   a step of executing logging, including extended information, based on said definition information.

2. A proxy processing method as described in claim 1, wherein access logging for logging processes of a request from a client is performed with logging data formed from a fixed-length standard log region and a variable-length extended log region,
   further comprising:
   a step of storing a log record length and fixed-length standard log information of logging data in a fixed-length standard log; and
   a step of storing in said variable-length/extended log region offset information indicating output position and extended logging data based on a variable-length region size and definition information in an extended logging definition file;
   wherein said generated access log is looked up to perform logging analysis and tabulation operations.

3. A proxy processing method as described in claim 2, further comprising:
   a step of performing analysis and tabulation of said access log by analyzing and tabulating fixed-length standard information through reference to said fixed-length standard log region in said access log; and
   a step of performing analysis and tabulation of said access log by referring to said variable-length extended log region of said access log, retrieving offset information for desired variable-length extended log information, and analyzing/tabulating variable length extended log data by accessing variable-length/extended logging data using said retrieved offset information.

4. A proxy processing method as described in claim 2, further comprising a step of storing any one or more of: endian information, statistical summary information, and a copy of said extended log definition information.

5. A proxy processing method, comprising:
   a step of sequentially reading state names from a state definition file containing states names in a transition sequence, each state representing a processing step in a processing sequence of a request from a client terminal;
   a step of retrieving from a module table a state information entry having a state name that was read, each entry of said module table containing a list of state information, and said state information containing a state name and an associated state identifier of the state, a session processing function for the state, a configuration function allocating a work region and the like, a session initialization function called when a session is initiated, and a session termination function called when a session is terminated.

6. A proxy processing method as described in claim 5, further comprising a step of setting up a state identifier by generating a unique identifier for a retrieved state information entry if a state identifier has not been defined and detecting overlapped assignments by, checking to see if an entry associated with said identifier is already set up in said state transition table.

7. A proxy processing method as described in claim 5, further comprising a step of registering a session initialization function and a session termination processing function onto a session initialization function list and a session termination function list, respectively, if the non-null session initialization function and the session termination function are defined in said state transition table.

8. In an operation for processing a request from a client terminal, a proxy processing method comprising:
   a step of reading a state definition file storing state names in a transition sequence, said states representing processing steps for said request operation;
   a state selection step of selecting state information defined in a standard module and extension modules matching with a state name specified in said state definition file, said standard module storing processing functions associated with standard states for standard features, and said extension modules storing processing functions associated with extended states for extended features;
   a state transition table generating step of generating, at startup, a state transition table based on selected state information, said state transition table storing a processing function associated with each state and a next transition state of said: state; and
   a step of executing a processing function defined for each state according to said generated state transition table.

9. A proxy processing method as described in claim 8, further comprising:
   a step of allocating a standard region in a session management table used to manage processing states for a request from a client terminal, said standard region being necessary for executing processing for standard states; and
   a step of allocating an extended region by executing an environment setup function for an extended state, said extended region being necessary for processing for said extended state.

10. A proxy processing method as described in claim 9, further comprising a step of executing logging operations associated with client requests and/or server responses, said logging operations being based on extended logging information stored in an extended region in said session management table.

11. A proxy processing method as described in claim 8, wherein:
   a module table stores, for each module object, a module name of the module object and a list of state information provided by the module object, said list of state information including, for each state, a state name and a state identifier of the state, a session processing function for the state, a function for initializing and allocating a work region, and a termination processing function; and
   said state selection step selecting, from said list of state information in said module table, a state information entry associated with a state name specified in said state definition file.

12. A proxy processing method as described in claim 8, wherein said state transition table associates a state identifier with a state name, a session processing function for the state, a configuration function performing allocation of a work region, a session initialization function called when a session is initiated, a session termination function called when a session is terminated, and a next state.

13. In a proxy processing method for storing state status representing processing steps in processing requests from client terminals, updating states, and using a state transition engine to sequentially execute processing functions associated with state, a proxy processing method comprising:

a step of executing said state transition engine, said state transition engine including:

(a) a step of looking up, for each session from a client terminal, a session management table storing information including state information, standard information, and extended information specific to extension modules;

(b) a step of using state information in said session management table to obtain a state transition table entry by looking up a state transition table storing session processing functions and default next states associated with each state;

(c) a step of executing a session processing function from said obtained state transition table entry; and (d) a step of determining a next transition state using a value returned from an executed session processing function, and setting up said next state information in said session management table entry; and a step of executing session processing for said next state if said returned value is that for transition to a next state, and returning to a scheduler and requesting said scheduler to schedule another ready session if said returned value is that for session rescheduling.

14. A proxy processing method as described in claim 13, comprising any one or more of the following steps:

a step of updating to a next default state, if a value returned from a session processing function is that for state transition to a default next state;

a step of updating to a state indicated in a predetermined fields, if a value returned from a session processing function is that for goto-type state transition to a state explicitly specified;

a step of updating to an error information reply state if a value returned from a session processing function is that for state transition to an error reply state; and a step of executing a session termination function, releasing said session management table entry, terminating said current session, and returning to said session scheduler, if a value returned from a session processing function is that for terminating the session processing.

15. A proxy processing method using a single processing process to simultaneously process requests from a plurality of clients, wherein:

operations from a receipt of a request to a termination of the processes of the request are handled as a single session, a process status is stored for each session in a session management table, and a session scheduler is used to schedule client sessions that have become ready to process;

said session scheduler including:

a step of checking for events indicating ready status for receiving request and response data;

a step of selecting one session management table entry out of entries for ready sessions, if a ready status event is generated or is received;

a step of executing a state transition engine, using as parameters said selected session management table entry and event information; and wherein said state transition engine includes a step of looking up a state transition table indicating a transition sequence of states representing processing steps for processing a request from a client terminal, and sequentially executing session processing functions in said state transition table entries associated with current state information stored in said session management table.

16. A proxy processing method as described in claim 15, wherein said session scheduler further includes a step of periodically performing a timeout check on each session.

17. A proxy processing method as described in claim 15, further comprising:

a step of executing a session initialization function when a connection is established, said session initialization function being obtained when said state transition table is built; and a step of executing a session termination function when a session is terminated.

18. A proxy processing method as described in claim 15, further comprising a step of storing in said session management table, for each session from a client terminal, state information and various types of standard information, as well as information containing extension information specific to extension modules, and, based on configuration functions associated with extended states of said extension modules, regions for module-specific extension information are allocated at start-up.

19. A proxy processing method as described in claim 18, further comprising a step of executing a logging operation for client requests and/or server responses based on standard information and extended information in said session management table.

20. A proxy processing method as described in claim 15, wherein said state transition engine includes:

a step of looking up a session management table storing, for each session from a client terminal, information-including state information, standard information, and module specific extension information;

a step of using said state information in said session management table to look up a state transition table to obtain a state transition table entry, said state transition table storing a session processing function associated with each state and a next transition state of said state;

a step of executing a session processing function of said obtained state transition table entry; and a step of determining a next transition state using a value returned from an executed session processing function and setting up said next state information in said session management table entry.

* * * * *